2 Sheets—Sheet 1.

A. J. MARTIN.
Force-Feed for Grain-Drills.

No. 201,029. Patented March 5, 1878.

Witnesses:
Donn I. Twitchell.
Will W. Dodge.

Inventor:
A. J. Martin,
by Dodge & Son
Atty.

N. PETERS, PHOTO-LITHOGRAPHER, WASHINGTON, D.C.

2 Sheets—Sheet 2.
A. J. MARTIN.
Force-Feed for Grain-Drills.
No. 201,029. Patented March 5, 1878.
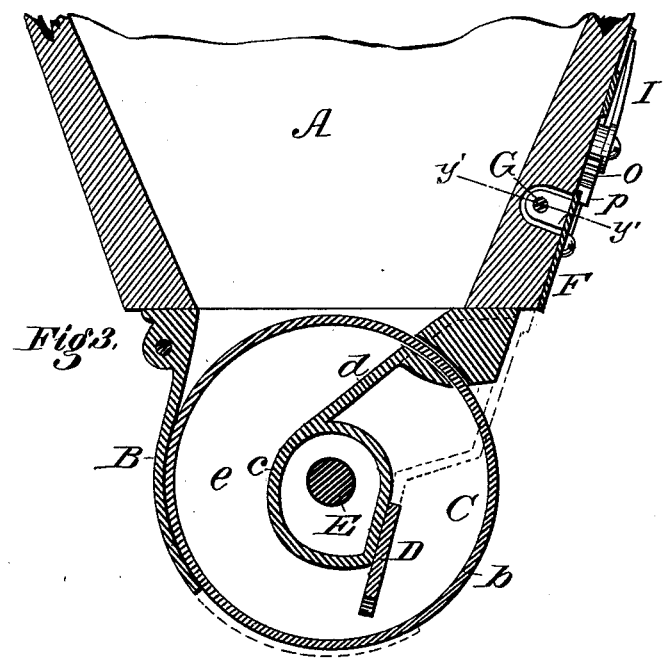
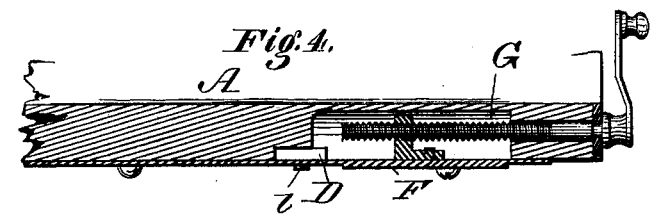
Witnesses:
Donn J. Twitchell.
Will N. Dodge.
Inventor:
A. J. Martin,
by Dodge & Son
Attys.

UNITED STATES PATENT OFFICE.

ANDREW J. MARTIN, OF SPRINGFIELD, OHIO, ASSIGNOR TO P. P. MAST & CO., OF SAME PLACE.

IMPROVEMENT IN FORCE-FEEDS FOR GRAIN-DRILLS.

Specification forming part of Letters Patent No. 201,029, dated March 5, 1878; application filed January 10, 1878.

*To all whom it may concern:*

Be it known that I, ANDREW J. MARTIN, of Springfield, in the county of Clarke and State of Ohio, have invented certain Improvements in Force-Feeds for Grain-Drills, of which the following is a specification:

My invention relates to that class of force-feeding devices in which the delivery of the grain in a continuous stream is effected by means of a vertical wheel mounted partly or wholly within a cup or case, and more especially to those devices in which the wheel has a peripheral side flange, on the inner face of which the grain is carried; and the invention consists in the use of a sliding gate or cut-off arranged to move inward across the grain-channel, in such manner as to limit and control the discharge without causing the grain to crowd or choke within the feeder, and in the manner of mounting and adjusting said gate, as hereinafter fully described.

Figure 1:
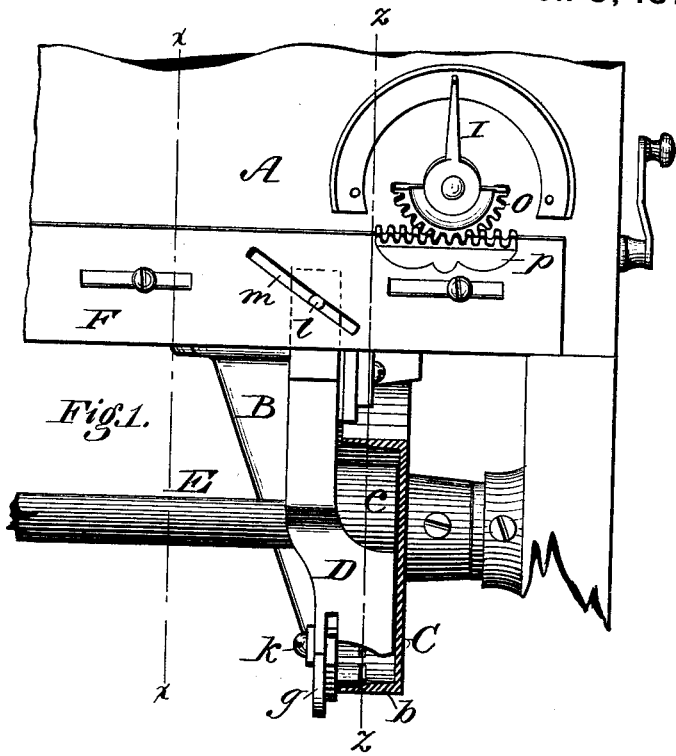
Figure 2:
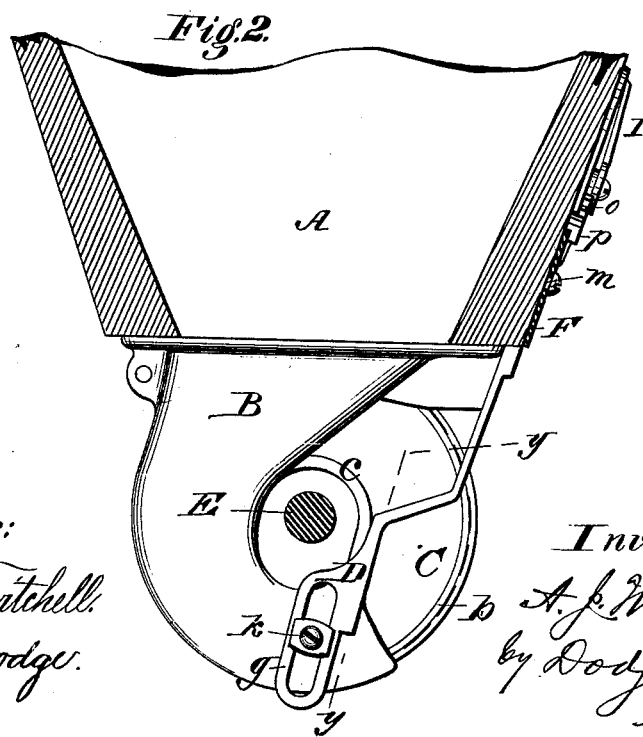

Figure 1 represents a rear elevation of my feeder attached to a grain-box or hopper, the feed-wheel being broken away on the line $y\ y$ of Fig. 2, in order to expose the end of the gate to view; Fig. 2, a sectional elevation of the device on the line $x\ x$ of Fig. 1; Fig. 3, a vertical section of the device on the line $z\ z$ of Fig. 1; Fig. 4, a section on the line $y'\ y'$, Fig. 3.

A represents the hopper or grain-box of a grain-drilling or a seeding machine; B, a feed cup or case attached thereto; C, a feed-wheel, and D my improved feed-regulating gate. The wheel consists of a flat circular disk, provided on one side with a hub to receive the driving-shaft E, and on the other side with a peripheral side flange or rim, $b$, by which the grain is carried. The cup or case is made with a flaring top to receive the grain, and is adapted on one side to fit closely upon the top of the wheel, and on the other to extend downward and cover the hollow side of the wheel to a point slightly in rear of the center, as shown, so that the grain entering the top of the cup is directed into the wheel and carried downward and backward, and discharged laterally at the rear edge of the cup, in substantially the same manner as in various feeders now in common use. The cup or case is made with a central hub, $c$, and upwardly-inclined wing $d$, extending therefrom, both arranged to enter the open side of the wheel, as shown in Fig. 3, so as to produce within the wheel a channel, passage, or throat, $e$, through which the grain is compelled to flow in order to reach the point of discharge.

The regulating-gate D consists of an upright plate, having its lower end seated against the rear side of the hub $c$ within the feed-wheel, as shown in Figs. 1 and 3, so that it may be moved downward to any desired extent across the seed channel or throat, in order to diminish the escape of the grain. The rear portion of the throat or channel is preferably made of a uniform, or nearly uniform, size, and the gate, by preference, given a slight forward inclination toward its lower end, as represented.

The gate may be guided and held in place in any suitable manner; but it is preferred to provide it with a slotted arm, $g$, extending down over the outside of the case or cup, and riding upon a screw or a stud, $k$, cast on the case, as shown. This construction is advantageous in that it is cheap and simple, and that it leaves the inner surfaces of the feeder smooth and regular, so as not to interfere with the uniform flow of the grain.

The gate D has its upper end seated in a bearing in the outside of the grain-hopper, and is provided with a stud, $l$, which is seated in an inclined or oblique groove, $m$, in a horizontally-sliding plate, F, which latter is mounted on the hopper, as represented, so that as the plate is moved endwise it raises or lowers the gate.

For the purpose of adjusting the sliding plate and gate, a screw, G, having a hand-crank on one end, is mounted in the outside of the grain-hopper, and extended through an ear on the inside of the sliding plate, as shown in Figs. 1 and 4.

As a guide by which to adjust the gate, a pivoted pointer or index-arm, I, pivoted on the hopper, and arranged to sweep over a properly-graduated plate or scale, is provided with a sector-pinion, O, which engages in a rack, $p$, on the upper edge of the sliding plate, as clearly shown in Figs. 1 and 2, so that as the plate is moved the pointer indicates the amount of grain which will be sown per acre, when the gate is in each of its various positions.

By means of the screw and index a very quick and accurate adjustment of the gate may be made; but it is manifest that the gate may be adjusted by means other than those shown—as, for example, by a rock-shaft and pinion, or by a stud on the slide acting in a slot or groove in the gate.

In constructing a full-sized machine, a series of feeding devices arranged in line, and all driven by the one feed-shaft, as usual, will be used. The sliding plate will also be extended the full width of the machine, and connected with the gates of all the feeders, so as to effect the simultaneous and equal adjustment of them all.

The angle or inclination at which the gate extends into or across the grain channel or passage may be varied; but the position represented in the drawing, in which the gate stands at a slight divergence from a radial line, is considered the best.

I am aware that pivoted swinging gates and laterally or transversely sliding gates have been hitherto employed in connection with force-feeding devices to vary and control the rate of feed, and I lay no claim thereto. The wheel used with my gate may have the usual central hub, if desired, and may also have inside ribs or teeth to assist in delivering the grain.

Having thus described my invention, what I claim is—

1. In a grain-drill feed, the combination of a feed-wheel having a side rim or flange to carry the grain, a feed cup or case, and a sliding gate arranged to slide radially or tangentially across the seed channel or passage, substantially as shown and described.

2. The combination of feed-wheel C, cup B, and upright gate D, having its lower end arranged to slide downward into or across the seed channel or throat.

3. The combination of a feed cup or case, a feed-wheel having a carrying rim or flange on its side, and a tangentially or radially sliding gate having its end arranged to slide into and across the throat or channel in the wheel.

4. In combination with the feed-wheel having the side rim or flange, and the feed cup or case having the central hub, the radially or tangentially sliding gate D, bearing upon the rear side of the hub, as shown.

5. In combination with the feed-wheel and cup or case, as shown, the radially or tangentially sliding gate D, having a guide-arm, $g$, bearing on the outside of the cup or case, substantially as shown.

6. The sliding gate D, having the arm $g$, in combination with the feed-cups having a stud, $k$, on the outside to support and guide said arm.

7. In combination with the feed-wheel, and the cup on grain-box or hopper, the radially or tangentially sliding gate having its upper end supported upon the hopper, and the sliding plate provided with inclined slots and connected with the gate, as shown and described.

ANDREW J. MARTIN.

Witnesses:
J. B. CHRISTIE,
E. C. CRAIN.